(12) United States Patent
Turner et al.

(10) Patent No.: US 6,816,492 B1
(45) Date of Patent: Nov. 9, 2004

(54) RESEQUENCING PACKETS AT OUTPUT PORTS WITHOUT ERRORS USING PACKET TIMESTAMPS AND TIMESTAMP FLOORS

(75) Inventors: Jonathan S. Turner, St. Louis, MO (US); Daniel E. Lenoski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 787 days.

(21) Appl. No.: 09/629,035

(22) Filed: Jul. 31, 2000

(51) Int. Cl.[7] .............................................. H04L 12/28

(52) U.S. Cl. ........................ 370/394; 370/418; 370/518

(58) Field of Search ................................. 370/252–254, 370/498, 503, 516–518, 395.1, 401, 352–356, 465–466, 310–314, 519, 394, 414–418

(56) References Cited

U.S. PATENT DOCUMENTS

| | | |
|---|---|---|
| 4,491,945 A | 1/1985 | Turner |
| 4,494,230 A | 1/1985 | Turner |
| 4,630,260 A | 12/1986 | Toy et al. |
| 4,734,907 A | 3/1988 | Turner |
| 4,829,227 A | 5/1989 | Turner |
| 4,849,968 A | 7/1989 | Turner |
| 4,893,304 A | 1/1990 | Giacopelli et al. |
| 4,901,309 A | 2/1990 | Turner |
| 5,127,000 A | 6/1992 | Henrion |
| 5,173,897 A | 12/1992 | Schrodi et al. |
| 5,179,551 A | 1/1993 | Turner |
| 5,179,556 A | 1/1993 | Turner |
| 5,229,991 A | 7/1993 | Turner |
| 5,253,251 A | 10/1993 | Aramaki |
| 5,260,935 A | 11/1993 | Turner |
| 5,337,308 A | 8/1994 | Fan |
| 5,339,311 A | 8/1994 | Turner |
| 5,402,415 A | 3/1995 | Turner |
| 5,473,385 A | * 12/1995 | Leske ..................... 375/240.26 |

(List continued on next page.)

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

*Primary Examiner*—Douglas Olms
*Assistant Examiner*—Van Nguyen
(74) *Attorney, Agent, or Firm*—The Law Office of Kirk D. Williams

(57) ABSTRACT

Methods and apparatus are disclosed for propagating timestamp floors throughout a packet switching system and using the timestamp floors received at a first component of the packet switching system to determine when a packet may be sent from a packet switching system. Each input of a first stage of a packet switching system maintains a floor register which is updated by copying the timestamp from each arriving packet. In some systems, if a packet is not received during a packet time, the timestamp is automatically updated, typically by adding a fixed time value. Periodically, the first stage switching element forwards a timestamp floor to the next stage switching elements. In one implementation, this distributed timestamp floor is the lesser of the earliest timestamp in one of the floor registers in the input queues, and the earliest timestamp in an output queue for the particular next stage switching element. In a buffering component, typically an output interface or possibly a final stage switching element, each output queue maintains a floor register for that output. When a packet in the particular output queue has a timestamp less than or equal to the timestamp floor maintained in the output queue, the packet is allowed to be sent.

26 Claims, 14 Drawing Sheets

U.S. PATENT DOCUMENTS

| | | | |
|---|---|---|---|
| 5,570,348 A | | 10/1996 | Holden |
| 5,721,820 A | | 2/1998 | Abali et al. |
| 5,842,040 A | | 11/1998 | Hughes et al. |
| 5,966,387 A | * | 10/1999 | Cloutier .................. 370/516 |
| 6,175,872 B1 | * | 1/2001 | Neumann et al. .......... 709/231 |
| 6,233,238 B1 | * | 5/2001 | Romanowski et al. ...... 370/389 |
| 6,246,684 B1 | * | 6/2001 | Chapman et al. .......... 370/394 |
| 6,373,821 B2 | * | 4/2002 | Staats ..................... 370/252 |
| 6,449,291 B1 | * | 9/2002 | Burns et al. ............... 370/516 |
| 6,452,950 B1 | * | 9/2002 | Ohlsson et al. ............ 370/516 |
| 6,493,832 B1 | * | 12/2002 | Itakura et al. ............. 713/600 |
| 6,505,247 B1 | * | 1/2003 | Steger et al. .............. 709/224 |
| 6,510,150 B1 | * | 1/2003 | Ngo ........................ 370/347 |
| 6,519,411 B1 | * | 2/2003 | Sugimura et al. ........... 386/65 |
| 6,584,125 B1 | * | 6/2003 | Katto ...................... 370/537 |
| 6,661,811 B1 | * | 12/2003 | Baker ...................... 370/516 |
| 6,665,317 B1 | * | 12/2003 | Scott ...................... 370/516 |

* cited by examiner

RESEQUENCING PACKETS AT OUTPUT PORTS WITHOUT ERRORS USING PACKET TIMESTAMPS AND TIMESTAMP FLOORS

FIELD OF THE INVENTION

This invention relates to communications systems; more particularly, the invention relates to resequencing packets in packet switching systems that use interconnection networks in which packets going to any single output link may leave the interconnection network in a different order than that in which they entered. The invention provides a way of resequencing packets at output ports of an interconnection network, without the possibility of resequencing errors, using packet timestamps and timestamp floors; timestamp floors provide a bound on the timestamps of packets that can be received in the future at a particular interconnection network output.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths than to provide a single higher rate path. Such designs also achieve other desired performance characteristics.

Buffered multistage interconnection networks are often used in Asynchronous Transfer Mode ("ATM") and others types of packet switching systems. Networks of this type use internal buffers to store packets at intermediate points when contention for output links prevents their immediate transmission.

Many multistage interconnection networks provide multiple paths between network inputs and outputs, allowing the traffic to be balanced across the alternative paths. An example of such a network 100 is shown in FIG. 1. This particular network is known as a three stage Beneg network. The network is composed of switch elements (SE's) and interconnecting links. SE's may have any number of input links and output links. The value d denotes the number of input links and the number of output links in a single SE and the value n denotes the number of input links and output links of the multistage network. Network 100 as shown in FIG. 1, has a d value of 4 and an n value of 16.

Traffic distribution in multistage networks is commonly done in one of two ways. In systems that use static routing, all packets associated with a given end-to-end session (in ATM networks, a session will typically be associated with a virtual circuit), follow the same path through the interconnection network. This path is selected when the session begins and typically remains fixed until the session is completed.

In systems that use dynamic routing, traffic is distributed on a packet-by-packet basis so as to equalize the traffic load across the entire interconnection network. Dynamic routing systems distribute traffic more evenly than systems that use static routing and consequently can be operated with lower speed internal links than are needed for systems that use static routing. However, because dynamic routing systems do not constrain the packets belonging to a single user session to a single path, they may allow packets in a given session to become out of order.

Systems using dynamic routing typically provide resequencing mechanisms to restore the correct packet order at the outputs of the switching system. Conventional mechanisms for resequencing usually ensure that packets are delivered in the correct order, but under unusual conditions, they can fail to reorder packets correctly.

A common method for resequencing packets in a multi-stage interconnection network uses timestamps and time-ordered output queues. Such systems have a central timing reference, which is distributed to the circuits at all inputs to the network and to the circuits at all outputs. When a packet enters the network at an input, the current time is inserted into a field in the packet. When the packet emerges from the network at the appropriate destination, the timestamp is used to insert the packet into a time-ordered queue. That is, packets are read from the queue in increasing order of their timestamp values. Associated with the queue is an age threshold which specifies the minimum time that must elapse between the time a packet entered the interconnection network until it is allowed to leave the resequencing buffer at the output. If the difference between the current time and the timestamp of the first packet in the buffer is smaller than the age threshold, then the first packet is held back (along with all others "behind" it in the buffer). This allows packets that are delayed for a long period of time in the interconnection network to catch up with other packets that experience smaller delays.

If the age threshold is larger than the maximum delay that packets ever experience in the interconnection network, then the time-based resequencing algorithm will always deliver packets in order. However, if packets are delayed by more than the time specified by the age threshold, errors may occur. In typical systems, delays in the interconnection network are usually fairly small (a few packet times per stage) and packets only rarely experience long delays. On the other hand, the worst-case delay may be very large. As a result, the age threshold is usually set not to the worst-case delay, but to a smaller value chosen to give an acceptably small frequency of resequencing errors. One can trade-off the resequencing delay for reduced probability of resequencing errors. Conventional time-based resequencing method can be implemented in various ways.

Because resequencing errors can cause errors in delivered data, leading to lost data or the need to retransmit data, it is advantageous to reduce or eliminate resequencing errors. Consequently, needed are new methods and apparatus for resequencing packets, so as to reduce or eliminate resequencing errors.

SUMMARY OF THE INVENTION

One embodiment of a packet switching system that employs the invention, includes an interconnection network that is used to provide communication from a set of input port circuits to a set of output port circuits. The input port circuits add a timestamp field to packets as they are sent to the interconnection network. The interconnection network contains switch elements that include circuits that maintain information about timestamp floors. A timestamp floor is a bound on the earliest timestamp values that can appear in packets that will arrive in the future. The interconnection network propagates timestamp floors to resequencers, typically located in the output port circuits, which use the timestamp floors to determine when packets can be forwarded on their outgoing links, without the possibility of resequencing errors.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
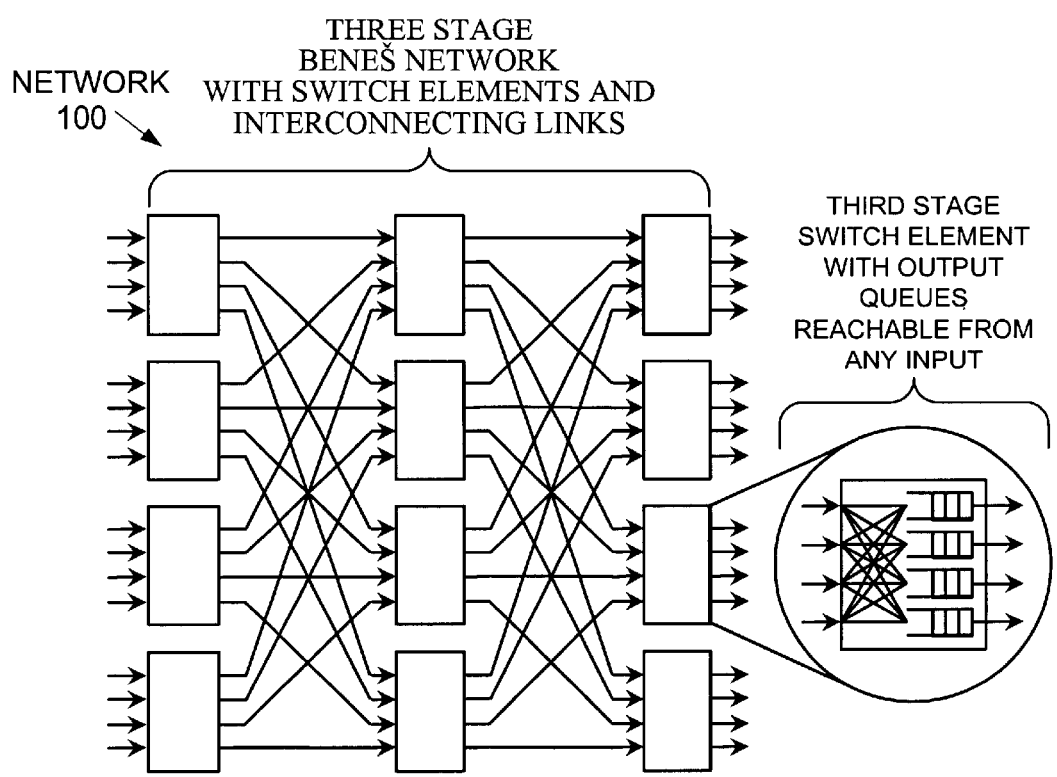
FIG. 1 is a block diagram of a prior art three stage Benes network.

Methods and apparatus are disclosed for resequencing packets without errors at packet switch output ports, using packet timestamps and timestamp floors. A timestamp floor indicates a lower bound on timestamps of packets that will be received in the future on a corresponding link. The resequencing of packets is done by components that are referred to here as packet resequencers, or simply resequencers. These may be located at any of several physical locations in the packet switching system, including switch elements in the last stage of the interconnection network, output line cards, or interface circuitry located between the interconnection network and the output line cards. The only requirement is that a resequencer that resequences packets for a particular link (or a subset of the packets for an output link) be positioned so that it can process all of the packets for that output link (or the subset of those packets that it is responsible for resequencing).

The methods and apparatus described herein are not limited to a single packet switching environment. Rather, the architecture and functionality taught herein are extensible to an unlimited number of systems, packet switching environments, and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, inter alia, systems, integrated circuit chips, methods, and computer-readable medium containing instructions. The embodiments described herein embody various aspects and configurations within the scope and spirit of the invention.

A system for resequencing packets is described herein. The system propagates timestamp floors throughout a packet switching system. Such a packet switching system typically has a central timing reference which is distributed among all of its components or uses a set of local time references and a protocol to keep these references in relative sync with each other. Thus, timestamp values and timestamp floors generated by different components at the same time will have the same, or very close to the same, value of time.

The timestamp floors received at the outputs of the packet switching system are compared to timestamps of packets to determine which packets can be sent from the packet switch without a resequencing error. Multistage interconnection networks are commonly constructed using switch elements that have a single output buffer for each outgoing link. In one embodiment, each switch element includes a "floor register" for each of its incoming links. The values of the floor registers may be maintained as follows. Whenever a first stage switch element receives a packet from an input port, it copies the timestamp value from the packet into the floor register. During any packet time when it does not receive a packet from the input port, it increments the floor register. In another embodiment, the input port sends a dummy packet containing its current time value to a next component of the packet switching system whenever the input port has no packet to send. In addition, every switch element periodically transmits a timestamp floor to each of its downstream neighbors, which they use to update their floor registers, by copying the received timestamp floors into their floor registers.

In one embodiment, the timestamp floor sent by a switch element ("SE") on a particular link is determined as follows. If t1 is the smallest (e.g., earliest) of the values in the SE's floor registers and t2 is the smallest (e.g., earliest) timestamp of any packet in the queue for the given output link, then the timestamp floor sent by the SE is the smaller (e.g., earlier) of t1 and t2. If timestamp floors are maintained in this way and if input ports assign timestamps to packets in increasing order, then the timestamp floor stored in a given register is always a lower bound on timestamps of packets that will be received in the future on that link.

A resequencer may use the timestamp floors to eliminate, resequencing errors. To do this, each resequencer maintains its own floor register, containing the most recent timestamp floor received from the network. Each resequencer maintains a time-ordered queue containing packets waiting to be allowed to proceed, but instead of holding packets until they reach a fixed age threshold, each output port holds a packet only until the value in its floor register is at least as large as the packet's timestamp. In such a case, because no future packet can have a smaller timestamp than the value in the floor register, this is sufficient to ensure that there are no resequencing errors. This approach also allows packets to be forwarded as soon as it is known that there is no chance of resequencing errors. For outputs that are not heavily loaded, this will allow packets to proceed more quickly through the resequencing buffer, without waiting until they achieve some fixed age threshold.

In another embodiment, floor registers are used in the resequencing of packets in a system which allows packets to have multiple priorities. Some multistage interconnection networks provide support for multiple priority classes. For example, a packet switching system can be augmented to handle multiple priority classes by replacing each output queue in each switch element with a set of queues, one queue for each priority class, and by providing a priority selection mechanism that determines how the different queues are serviced.

In one embodiment, each switch element maintains a set of floor registers for each priority class, in a manner similar to that described above. The floor registers for each priority class are maintained independently of those for the other priority classes, using procedures similar to those in the previous section. Systems of this sort, include separate resequencers for each priority class at each output port. Each of these resequencers has a time-ordered queue of packets and a floor register. Packets are forwarded from these resequencers using procedures similar to those described above, in combination with a scheduling policy consistent with the desired priority treatment of packets in different priority classes.

Still, in yet another embodiment, floor registers are used in the resequencing of packets in a system which has per output queues. When traffic for different output ports of a multistage network shares buffers within the network, a congested output may cause delays for traffic going to outputs that are not congested. It is desirable to isolate traffic to congested outputs so that it does not cause unnecessary delays for traffic going to uncongested outputs. Separate buffers may be maintained within switch elements for each network output so that SE's can be extended to provide separate sets of floor registers for each network output. These can be maintained in a manner similar to that previously described in order to provide error-free resequencing.

Some systems provide per output queues only in the later stages of the interconnection network, since this is where queuing is most likely to occur and where per output queues are most likely to be useful. In such a system, the use of separate sets of floor registers for different outputs can be limited to the SE's that actually have per output queues. Systems using such hybrid approaches are more scaleable in terms of SE memory (for queue headers and floor registers) and in terms of bandwidth on the interconnection network links (for propagating floor information).

DETAILED OF EXEMPLARY EMBODIMENTS

Figure 2A:
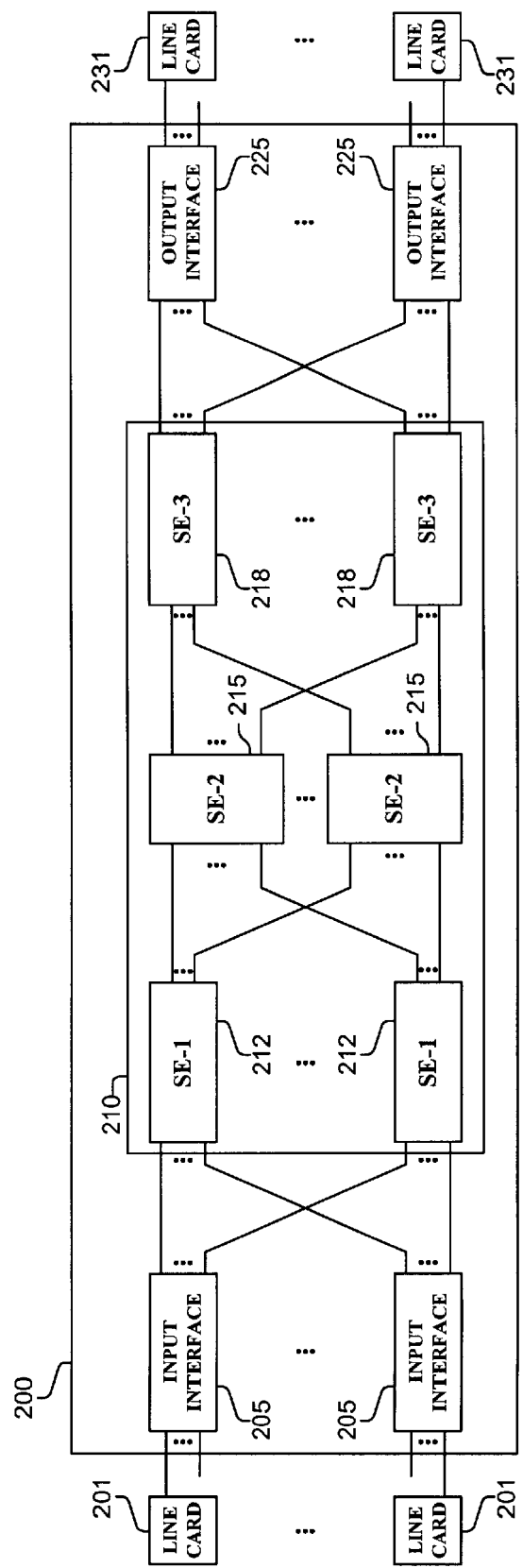
FIGS. 2A–C are block diagrams of a few of many possible embodiments of a packet switching system.

FIGS. 2A–4B and their discussion herein are intended to provide a description of various exemplary packet switching systems. FIGS. 2A–C illustrate the basic topology of different exemplary packet switching systems. FIG. 2A illustrates an exemplary packet switch 200 having multiple inputs and outputs and a single interconnection network 210. FIG. 2B illustrates an exemplary packet switch 240 having multiple interconnection networks 241 and folded input and output interfaces 249. FIG. 2C illustrates an exemplary folded packet switch 260 having multiple interconnection networks 161 and folded input and output interfaces 269. Embodiments propagate timestamp floors throughout each of these packet switches 200, 240 and 260 and use the timestamp floors received at a component to resequence packets in the manners disclosed herein. Of course, the invention is not limited to these illustrated operating environments and embodiments, and the packet switching systems may have more or less elements.

FIG. 2A illustrates an exemplary embodiment of a packet switch 200. Packet switch 200 comprises multiple input interfaces 205, interconnection network 210, and output interfaces 225. Input interfaces 205 and output interfaces 225 are both coupled over multiple links to interconnection network 210. In one embodiment, packet switching components 201 and 231 may be line cards and may be coupled to input interfaces 205 and output interfaces 225. In certain embodiments including other packet switching topologies, line cards or their functionality may be included in the packet switch itself, or as part of the packet switching system.

In one embodiment, interconnection network 210 comprises multiple switch elements SE-1 212, SE-2 215, and SE-3 218 that are interconnected by multiple links. Line cards 201 and 231 may connect to other systems (not shown) to provide data items (e.g., packets) to be routed by packet switch 200. Timestamp floors are distributed through interconnection network 210. The timestamp floors received at a component (e.g., SE-3 218, output interface 225, line card 231, and/or other locations within packet switch 200 or the packet switching system) may be used to resequence packets.

Figure 2B:
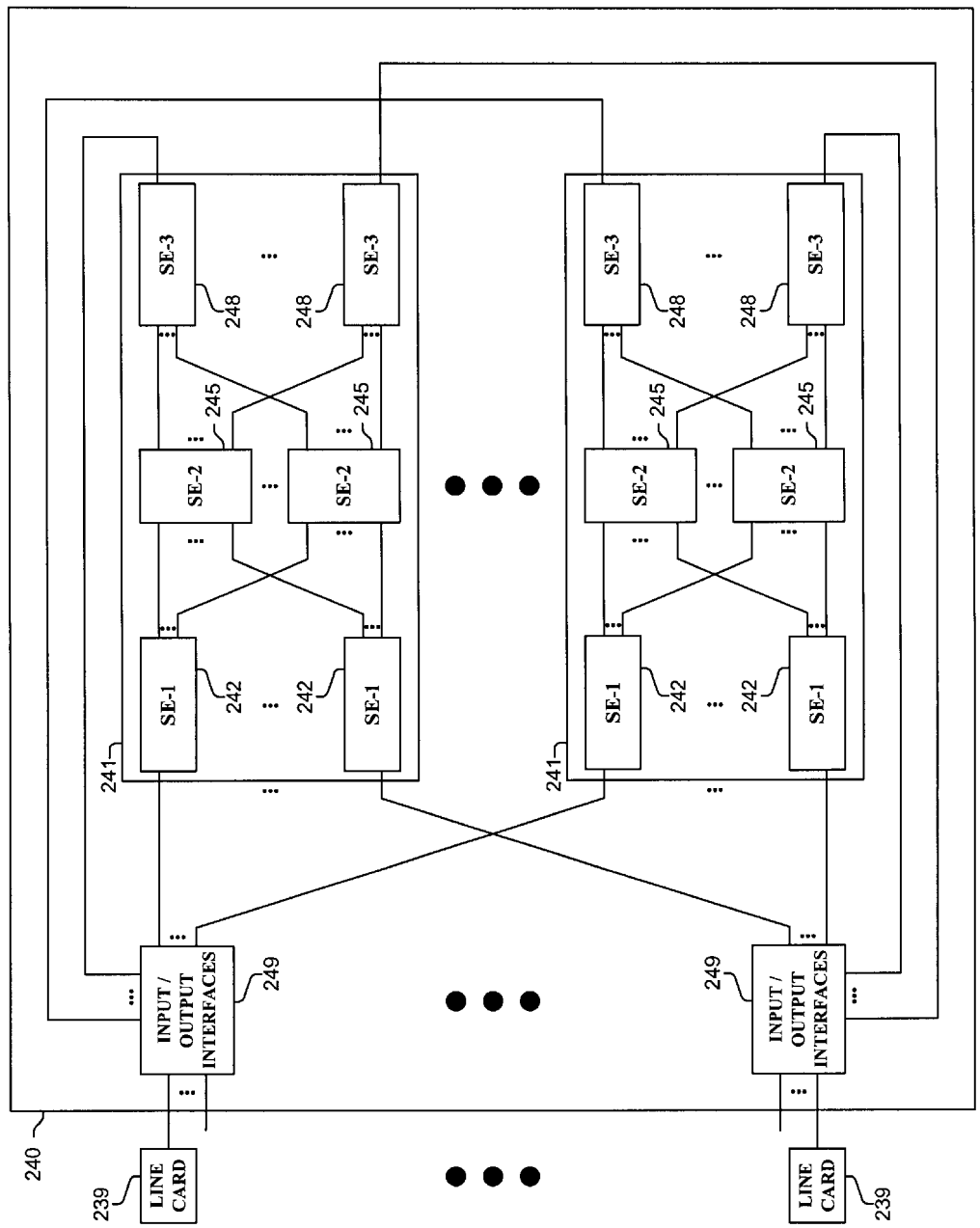

FIG. 2B illustrates another exemplary operating environment and embodiment of a packet switch 240. Packet switch 240 comprises multiple folded input and output interfaces 249 interconnected over multiple links to interconnection networks 241, which are interconnected over multiple links returning to input and output interfaces 249. In one embodiment, interconnection networks 241 comprise multiple switch elements SE-1 242, SE-2 245, and SE-3 248 also interconnected by multiple links. Interfaces 249 may connect via bidirectional links to line cards 239 that connect with other systems (not shown) to provide data items (e.g., packets) to be routed by packet switch 240. Timestamp floors are distributed through interconnection network 241. The timestamp floors received at a component (e.g., SE-3 248, input/output interface 249, line card 239, and/or other locations within packet switch 240 or the packet switching system) may be used to resequence packets.

Figure 2C:
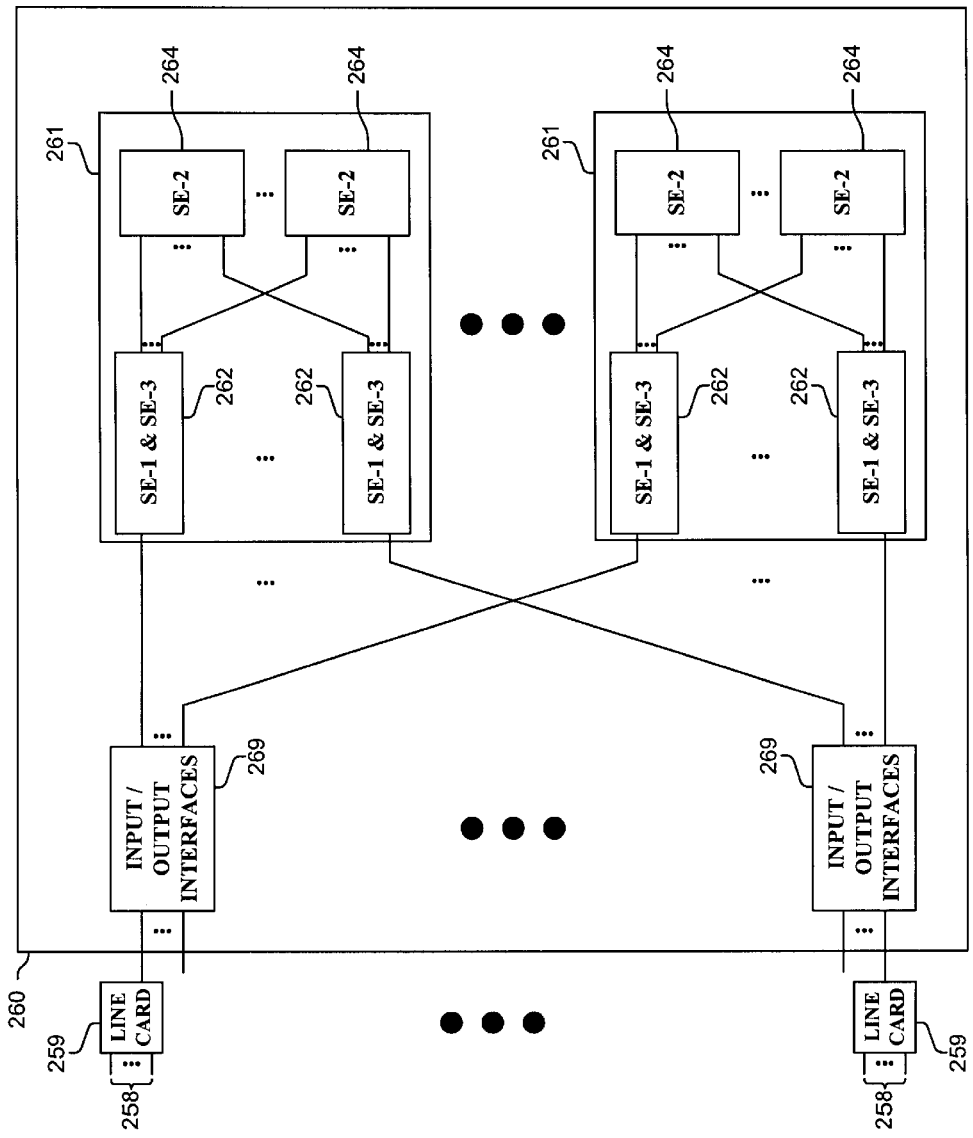

FIG. 2C illustrates another exemplary operating environment and embodiment of a packet switch 260. Packet switch 260 has a folded network topology. Packet switch 260 comprises multiple folded input and output interfaces 269 interconnected over multiple links to interconnection networks 261, which are interconnected over multiple links returning to interfaces 269. In one embodiment, interconnection networks 261 comprise multiple switch elements SE-1 & SE-3 262 and SE-2 264 also interconnected by multiple links. Interfaces 269 may connect via bi-directional links to line cards 259 which connect via ports 258 to other systems (not shown) to provide data items to be routed by packet switch 260. Timestamp floors are distributed through interconnection network 261. The timestamp floors received at a component (e.g., SE-1 & SE-3 262, input/output interface 269, line card 259, and/or other locations within packet switch 260 or the packet switching system) may be used to resequence packets.

Figure 3A:
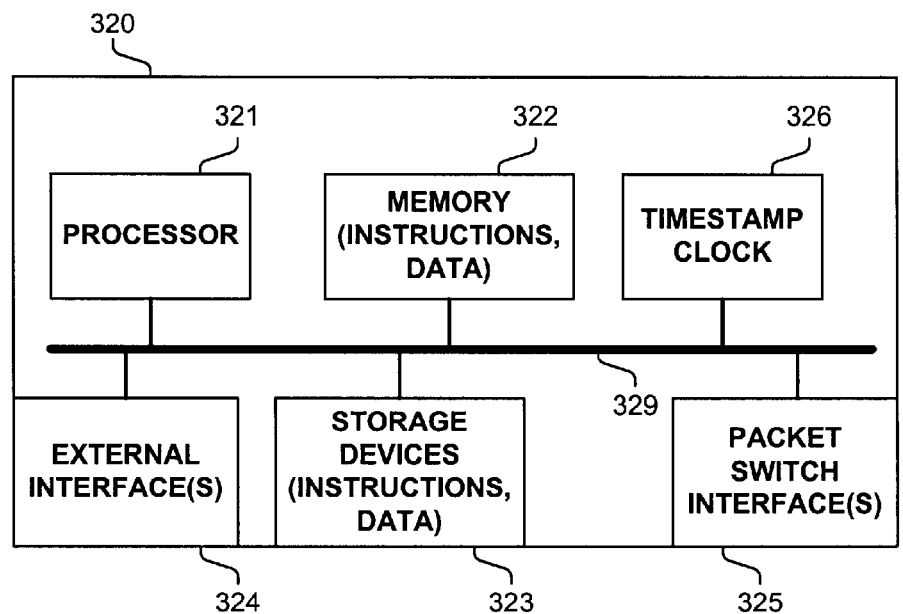
FIGS. 3A–C are block diagrams illustrating exemplary embodiments of a packet switching system component, such as, for example, a line card and/or input/output interface.
Figure 3B:
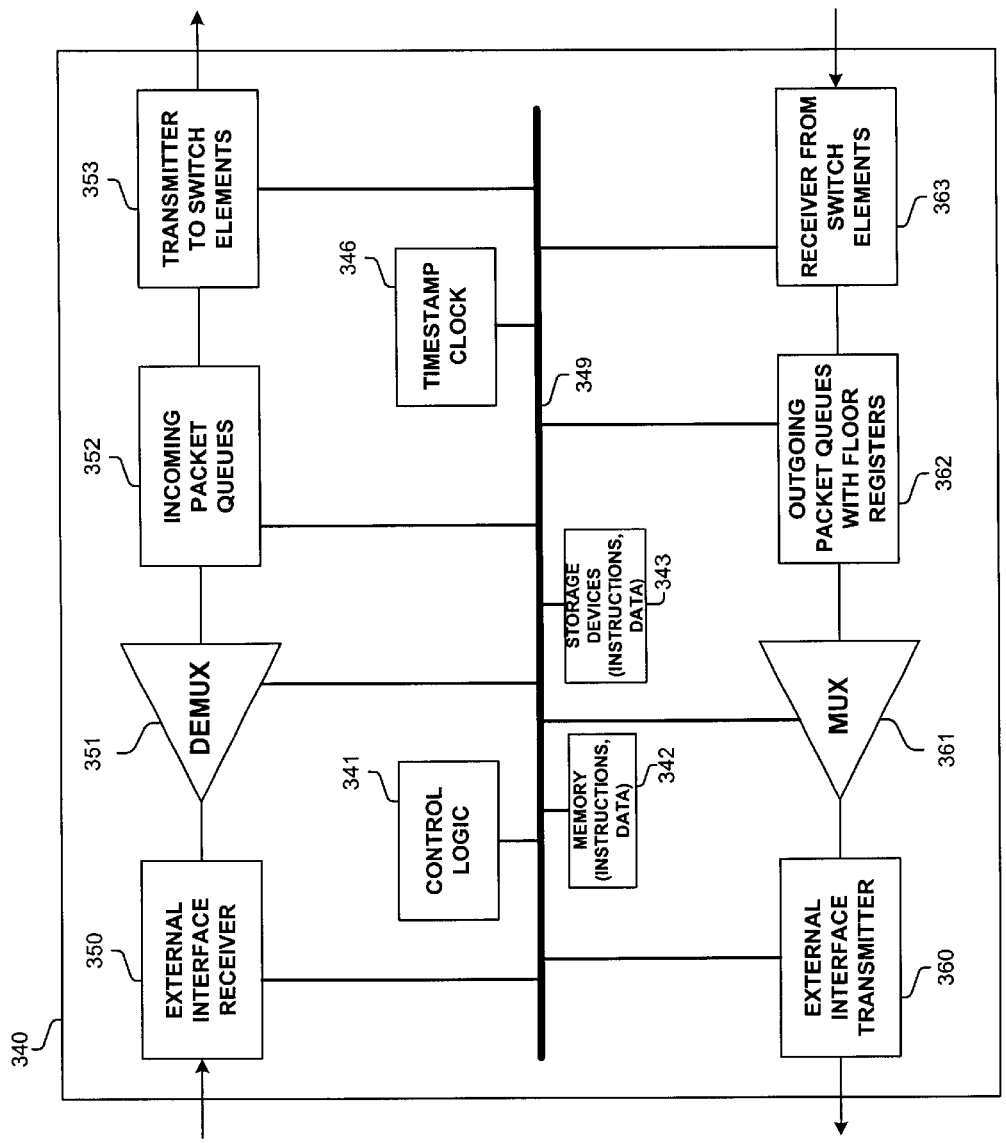
Figure 3C:
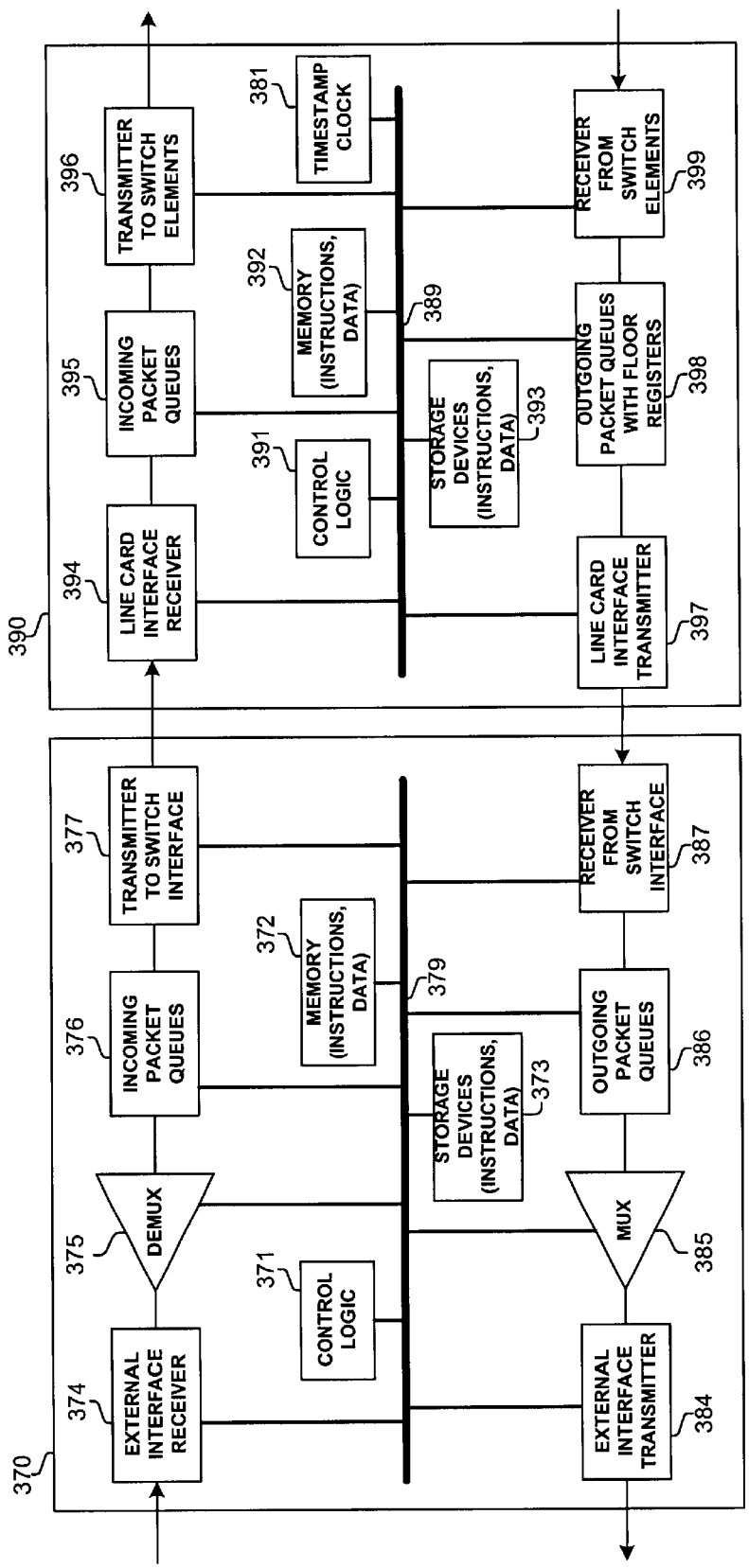

FIGS. 3A–C illustrate three of numerous possible embodiments of a line card, input interface, output interface, and/or input/output interface. For illustrative purposes, only single transmitters and receivers may be shown. It should be clear to one skilled in the art that multiple transmitters and receivers may be used to communicate with multiple sources and destinations (e.g., line cards, switch fabrics, etc.).

FIG. 3A illustrates packet switching component 320 which may be used to generate, propagate, and/or receive a timestamp floors, and/or use these timestamp floors to determine when a packet may be sent from the packet switching system. In one embodiment, packet switching component 320 comprises a processor 321, memory 322, storage devices 323, and one or more external interface(s) 324, and one or more packet switch interface(s) 325, timestamp clock 326, and one or more internal communications mechanisms 329 (shown as a bus for illustrative purposes). External interface(s) 324 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 322 is one type of computer-readable medium, and typically comprises random access memory (RAM), read only memory (ROM), integrated circuits, and/or other memory components. Memory 322 typically stores computer-executable instructions to be executed by processor 321 and/or data which is manipulated by processor 321 for implementing functionality in accordance with certain embodiments described herein. Storage devices 323 are another type of computer-readable medium, and typically comprise disk drives, diskettes, networked services, tape drives, and other storage devices. Storage devices 323 typically store computer-executable instructions to be executed by processor 321 and/or data which is manipulated by processor 321 for implementing functionality in accordance with certain embodiments described herein. For example, in one embodiment, packet queues and floor registers are stored in memory 322 and/or storage devices 323, with the determination of whether a packet may proceed from component determined by processor 321. While in another embodiment, all or part of this functionality is included in external interfaces 324 and/or packet switch interfaces 325. Timestamp clock 326, comprising a clock, counters and/or other components, maintains a timestamp value for inserting into packets sent to a packet switch. In one embodiment, packet switching component 320 will send out a dummy packet containing a timestamp to the connected packet switch, while in other embodiments it does not send out these dummy packets. In some embodiments, timestamp values are generated by processor 321 rather than, or in addition to, timestamp clock 326.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 3B illustrates packet switching component 340 having a single element providing the functionality of a line card and an input/output interface, for example that of line card 259 and input/output interface 269 (FIG. 2C). FIGS. 3B–C will be described in relation to FIG. 2C for illustrative purposes; however, these embodiments could be used with other packet switch topologies and other implementations and embodiments.

In one embodiment, packet switching component 340 comprises control logic 341 implementing functionality in accordance with certain embodiments described herein. In one embodiment control logic 341 includes memory for storage of data and instructions. Control logic 341 is connected to other components of embodiment 340 via one or more internal communications mechanisms 349 (shown as a bus for illustrative purposes). In one embodiment, control logic 341 includes memory for storing instructions and data. Line card 340 may also includes optional additional memory 342 and storage devices 343. External interface receiver 350 receives external signals, separates the signals into channels using demultiplexor 351 into multiple streams of packets which are temporarily stored in incoming packet buffer 352. At the appropriate time, a packet containing a timestamp maintained by timestamp clock 346 is sent to the appropriate switch element SE-1 & SE-3 262 via transmitter to switch elements 353. In some embodiments, timestamp values are generated by control logic 341 rather than, or in addition to, timestamp clock 346. In one embodiment, packet switching component 340 will send out a dummy packet containing a timestamp to the connected packet switch, while in other embodiments it does not send out these dummy packets.

Packets are received from switch elements SE-1 & SE-3 262 at the receiver from switch elements 363 and are buffered in resequencer 362. When a timestamp of a packet stored in a queue is less than or equal to a timestamp floor stored in a corresponding floor register, the packet is allowed to proceed. Multiplexor 361 receives packets from resequencer 362 and creates a multiplexed signal which is transmitted via external interface transmitter 360. In one embodiment, control logic 341 referencing a data structure within control logic 371 or memory 372, implements functionality in accordance with certain embodiments described herein.

FIG. 3C illustrates an embodiment of a line card 370 and a switch interface 390, which could correspond to line card 259 and input/output interfaces 269 illustrated in FIG. 2C.

The embodiment of line card 370 illustrated in FIG. 3C includes control logic 371 implementing functionality in accordance with certain embodiments described herein. Control logic 371 is connected to other components of line card 370 via one or more internal communications mechanisms 379 (shown as a bus for illustrative purposes). In one embodiment, control logic 371 includes memory for storing instructions and data. Line card 370 also includes optional additional memory 372 and storage devices 373. External interface receiver 374 receives external signals 258 (FIG. 2C), separates the signals into channels using demultiplexor 375 into multiple streams of packets which are temporarily stored in incoming packet buffer 376. At the appropriate time, a packet is sent to switch interface 390 via transmitter to switch interface 377. Packets are received from switch interface 390 at the receiver from switch interface 387 and placed in the outgoing packet buffer 386. Multiplexor 385 extracts the packets and creates a multiplexed signal which is transmitted via external interface transmitter 384. In one embodiment, control logic 371, referencing a data structure within control logic 371 or memory 372, implements functionality in accordance with certain embodiments described herein.

The embodiment of input/output interface 390 illustrated in FIG. 3C includes control logic 391 implementing functionality in accordance with certain embodiments described herein. Control logic 391 is connected to other components of switch interface 390 via one or more internal communications mechanisms 389 (shown as a bus for illustrative purposes). In one embodiment, control logic 391 includes memory for storing instructions and data. Switch interface 390 also includes optional additional memory 392 and storage devices 393. Line card receiver 394 receives packets from line card 370 temporarily stores the packets in incoming packet buffer 395. At the appropriate time, a packet containing a timestamp maintained by timestamp clock 381 is sent to an appropriate switch element SE-1 & SE-3 262 via transmitter to switch elements 396. In some embodiments, timestamp values are generated by control logic 391 rather than, or in addition to, timestamp clock 381. In one embodiment, packet switching component 390 will send out a dummy packet containing a timestamp to the connected packet switch, while in other embodiments it does not send out these dummy packets.

Packets are received from switch elements SE-1 & SE-3 262 at the receiver from switch elements 399 and buffered in resequencers 398. When a timestamp of a packet stored in a queue is less than or equal to a timestamp floor stored in a corresponding floor register, the packet is allowed to proceed. Line card interface transmitter 397 then forwards these to line card 370. In one embodiment, control logic 391, referencing a data structure within control logic 391 or memory 392, implements functionality in accordance with certain embodiments described herein.

In one embodiment, resequencer 398 includes one or more output queues and associated floor registers. Other embodiments employ floor registers maintained elsewhere, such as in memory 392 or storage devices 393. The contents of this floor register are used to indicate a timestamp threshold. Packets having a timestamp equal to, or less than this timestamp threshold are sent out of line card interface transmitter 397 to line card 370. Each output queue 398 may be maintained in a time-ordered fashion such that only the timestamp of the packet at the head of each output queue 398 needs to be compared to its respective floor register. Because no packet arriving in the future at input/output interface 390 can have a smaller timestamp value than the floor register maintained for the corresponding output queue 398, packets may be sent out without resequencing errors. In addition, a packet can be sent out as soon as soon as the floor register is updated with a value at least as large as the timestamp of the pending packet. Particularly for outputs that are not heavily loaded, packets are typically allowed to proceed from the packet switching system more quickly than certain other approaches, such as those requiring a packet to remain in a packet switching system for a predetermined fixed age threshold.

Figure 7A:
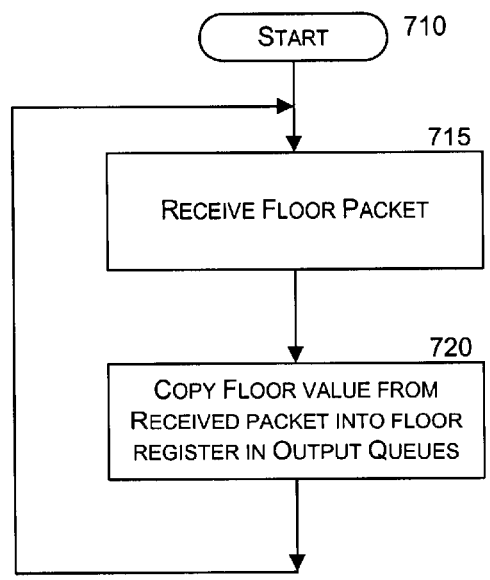
FIG. 7A is a flow diagram of an exemplary process for updating output floor registers based on a received timestamp floor distribution packet.

One embodiment for updating the floor registers in the output queues 398 is illustrated by the flow diagram of FIG. 7A. Processing begins with process block 710, and proceeds to process block 715, where a floor distribution packet is received, such as floor distribution packet 550 of FIG. 5C. Packet 550 contains a header field 551, a timestamp floor 552, and possibly other fields 553. Next, in process block 720, the timestamp floor is extracted from the received packet and copied into the floor register in output queue 398. Processing then returns to process block 715.

Figure 7B:
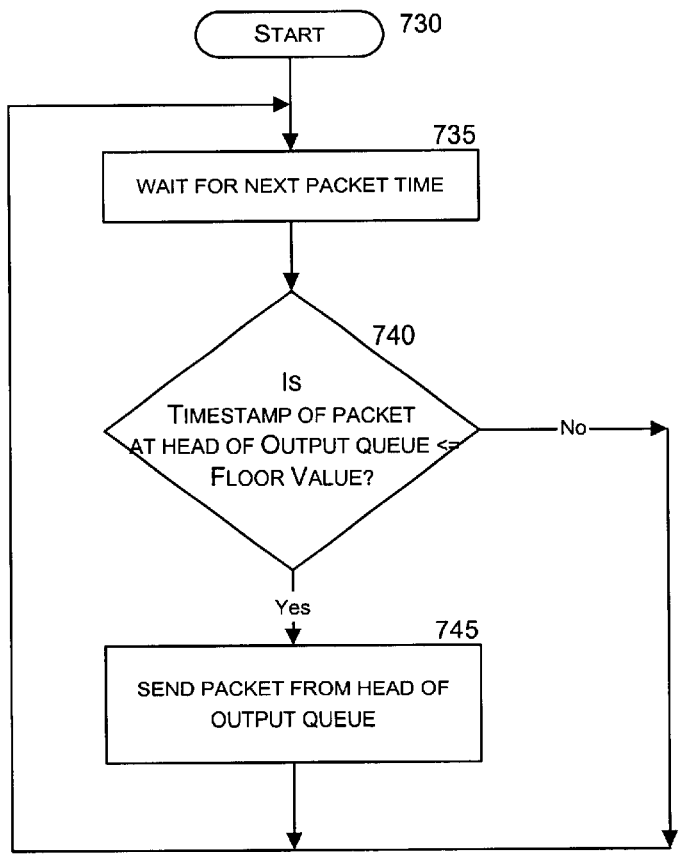
FIG. 7B is a flow diagram of an exemplary process for sending packets whose timestamp is less than or equal to the timestamp floors maintained for an output queue.

One embodiment for sending out packets from an output queue 398 using a floor register is illustrated in the flow diagram of FIG. 7B. Processing begins with process block 730, and proceeds to process block 735, where the process waits for the next time in which it may send a packet. Next, as determined by process block 740, if the timestamp of the packet at the head of output queue 480 is less than or equal to the timestamp floor maintained in output queue 480, then the packet is sent out-in step 745. Processing then returns to process block 735.

Figure 3D:
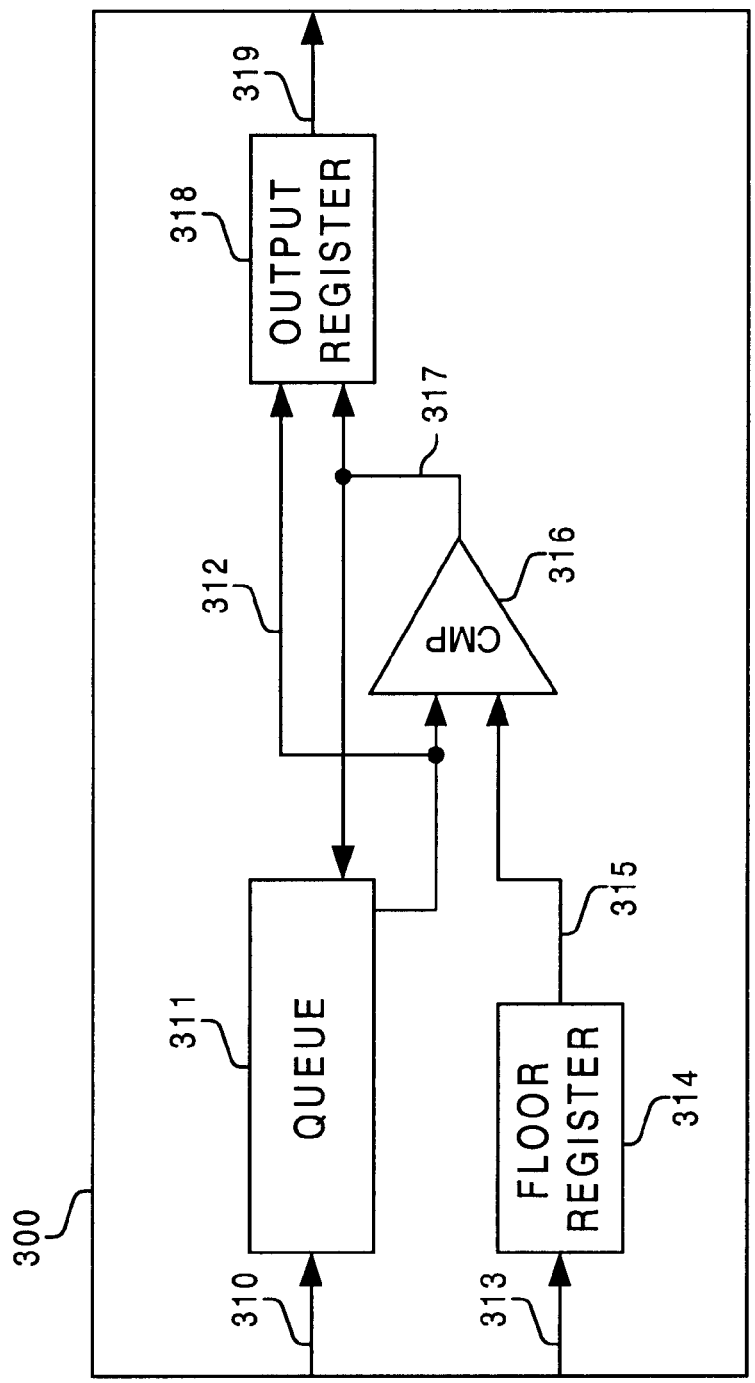
FIG. 3D is a block diagram of an exemplary logical diagram of an output queue with a floor register.

One embodiment of a resequencer is illustrated in FIG. 3D. In one embodiment, outgoing packet queues with floor registers 362 (FIG. 3B) and/or outgoing packet queues with floor registers 398 (FIG. 3C) include output queue with floor register 300. Other embodiments use other control logic, such as, for example, control logic 341 (FIG. 3B) or control logic 391 (FIG. 3C) instead of, or in addition to, the circuitry illustrated in FIG. 3D for queuing packets and/or allowing packets to proceed with their timestamps are less than or equal to a corresponding timestamp floor.

In the embodiment illustrated in FIG. 3D, a packet (or some identifier of a packet) is received over line 310 and placed in queue 311. Queue 311 is typically maintained such that the packet with the earliest timestamp is at the head of the queue, although this is not required. Timestamp floors are received over link 313 and placed in floor register 314. A comparator 316 compares (1) the value of the earliest timestamp of the packets maintained in queue 311 which it receives over link 312 with (2) the timestamp floor stored in floor register 314 and received over link 315. When the timestamp is at least as great as the value of the floor register, comparator 316 generates an enable signal 317 which is used to place the packet to be sent out of the packet switch in output register 318, and used to remove the packet from queue 311. The packet can then be sent over output link 319. In another embodiment, there is no output register 318 as the packet to be sent is not latched into an output register, but rather is transmitted from the packet switch directly from queue 311 over output link 319.

Figure 4A:
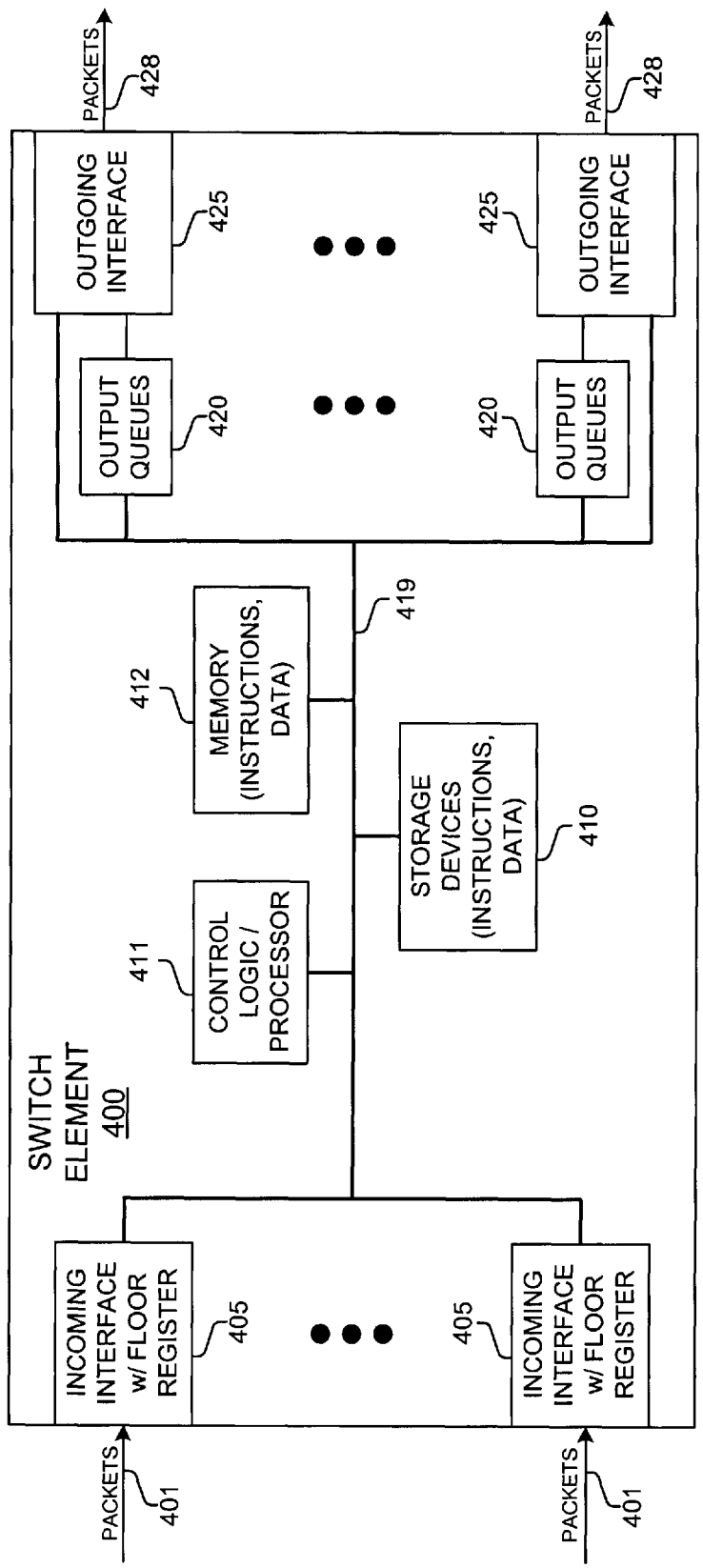
FIGS. 4A–B are block diagrams illustrating exemplary embodiments of switching elements having floor registers.
Figure 4B:
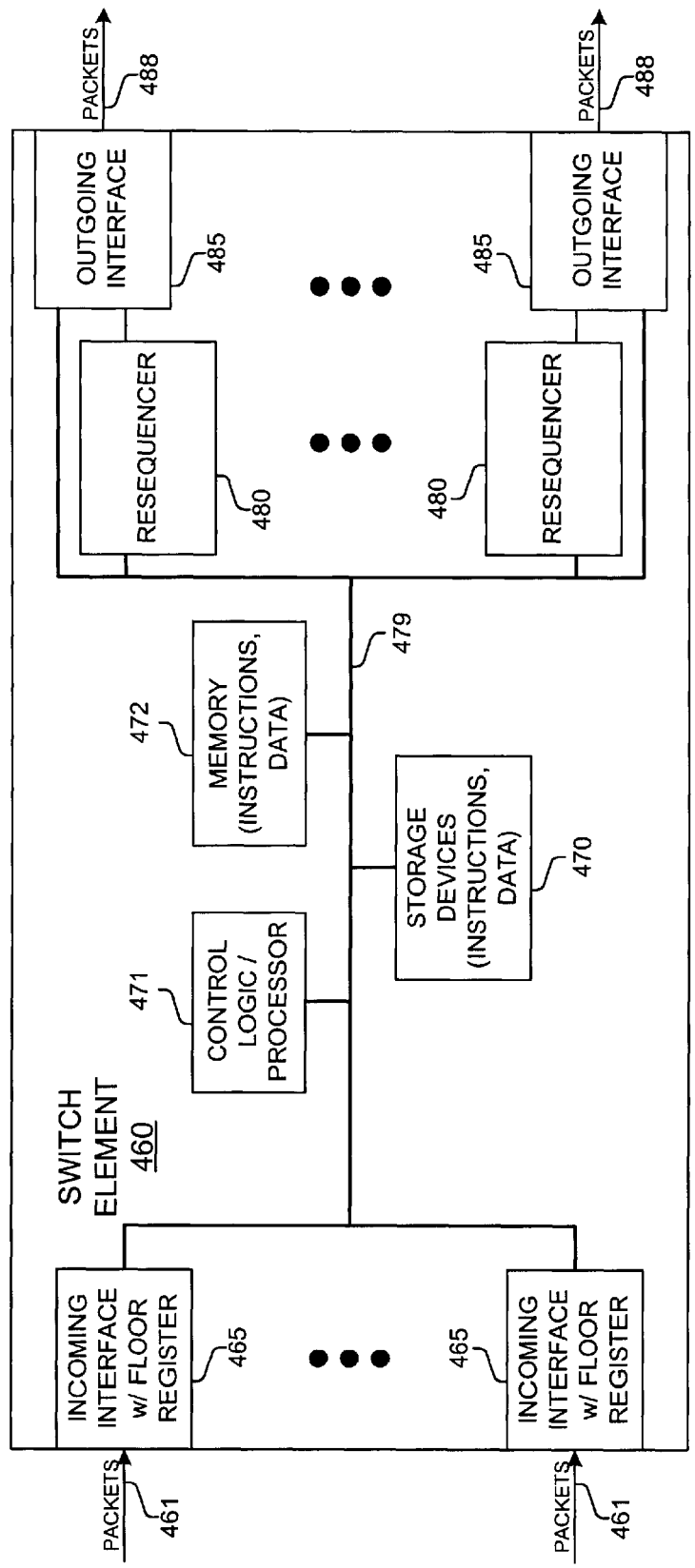

FIGS. 4A–B illustrate exemplary embodiments of switching elements and/or their components in accordance with certain embodiments described herein. FIG. 4A is a block diagram of one embodiment of a switching element 400 including floor registers for incoming links, while FIG. 4B is a block diagram of another embodiment of switching element 430 including floor registers for incoming links and output queues with floor registers for outgoing links. As would be understood by one skilled in the art, the invention is not limited to these or any other embodiment described herein. Rather, the invention as described herein is extensible to an unlimited number of embodiments and implementations.

FIG. 4A illustrates an embodiment of switching element 400 comprising control logic and/or processor 411 (hereinafter "control logic"), memory 412, storage devices 410, incoming interfaces with floor registers 405, output queues 420, outgoing interfaces 425, and one or more internal communications mechanisms 419 (shown as a bus for illustrative purposes). In certain embodiments, control logic 411 comprises custom control circuitry for controlling the operation of switching element 400 and no storage device 410 is used. Memory 412 is one type of computer-readable medium, and typically comprises random access memory (RAM), read only memory (ROM), integrated circuits, and/or other memory components. Memory 412 typically stores computer-executable instructions to be executed by control logic 411 and/or data which is manipulated by control logic 411 for implementing functionality in accordance with certain embodiments of the invention. Storage devices 410 are another type of computer-readable medium, and typically comprise disk drives, diskettes, networked services, tape drives, and other storage devices. Storage devices 410 typically store computer-executable instructions to be executed by control logic 411 and/or data which is manipulated by control logic 411 for implementing functionality in accordance with certain embodiments described herein. Outgoing packets are placed in output queues 420. In one embodiment, there is an output queue 420 for each destination, or for each class of service for each destination.

Switch element 400 receives packets, maintains multiple floor registers, and propagates timestamp floors to other switch components as described in detail herein. Each switch element 400 receives packets 401 over one or more links with one or more input interfaces (not shown) such as input/output interface 390 (FIG. 3C) via incoming interfaces with floor registers 405. Additionally, each switch element 400 sends packets 428 over one or more links with one or more other switch element elements (not shown) via outgoing interfaces 425.

In one embodiment, switch element 400 maintains a floor register in each incoming interface with floor register 405. Other embodiments maintain a single floor register, or multiple floor registers elsewhere, such as in memory 412 or storage devices 410. This floor register is updated to maintain a time value that is a lower bound on timestamps of packets that will be received at that particular incoming interface with floor register 405, assuming that packets arrive with timestamps in increasing order (possibly with allowance for wrap-around of the timestamp value within a packet field). The operations of some of many embodiments for updating these floor registers are illustrated in FIGS. 5A–D.

Figure 5A:
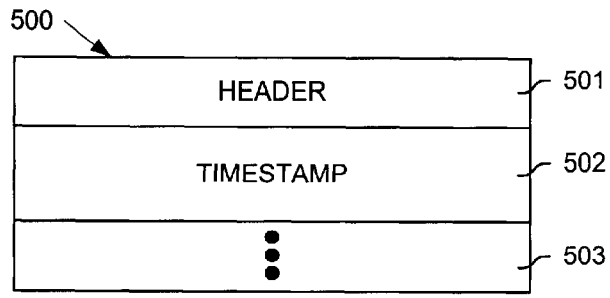
FIG. 5A illustrates an exemplary format of a packet containing a timestamp.
Figure 5B:
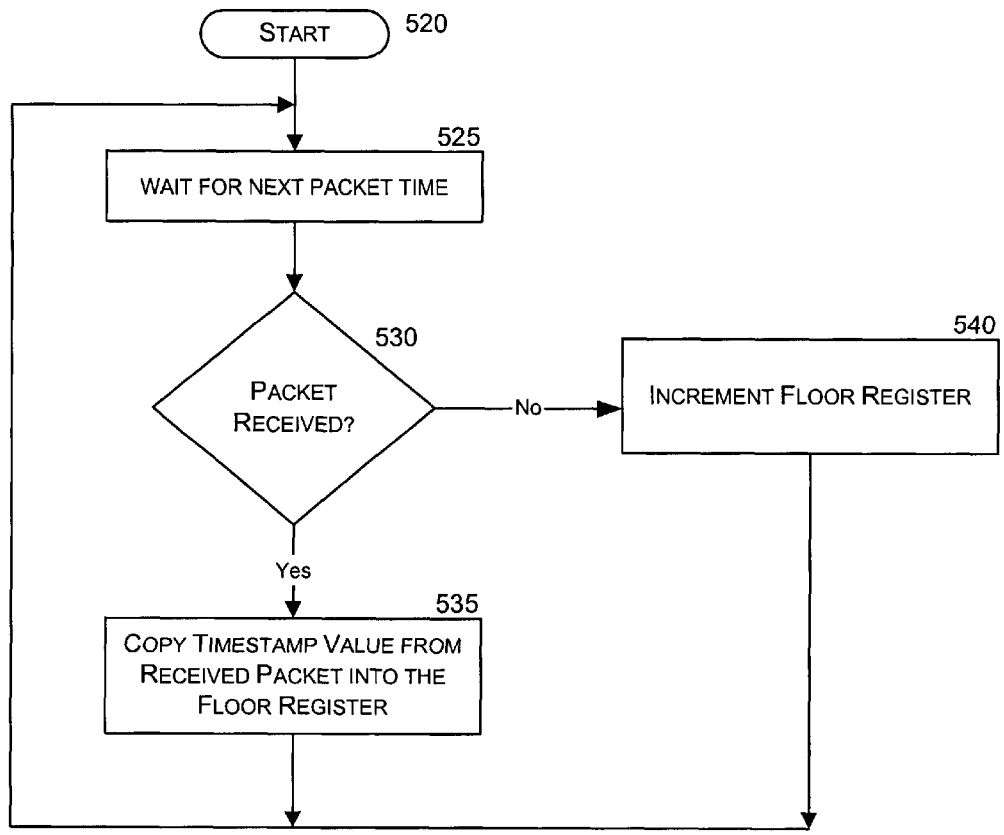
FIG. 5B is a flow diagram of an exemplary process for updating floor registers.

FIG. 5A provides an exemplary packet format 500, which may be the format of the arriving of packets 401 (FIG. 4A). Packet 500 includes a header field 501, a timestamp field 502, and other fields 503 (e.g., payload). FIG. 5B illustrates one process for updating one of the floor registers in an incoming interface with floor registers 405. Processing begins at process block 520 and proceeds to process block 525 where the process waits for the next packet time. Next, as determined in process block 530, if a packet is received, the timestamp value from the received packet is copied into the floor register in process block 535. Otherwise, process block 540 is performed to increment the floor register, typically, for example, some fixed constant values such as one.

Figure 5C:
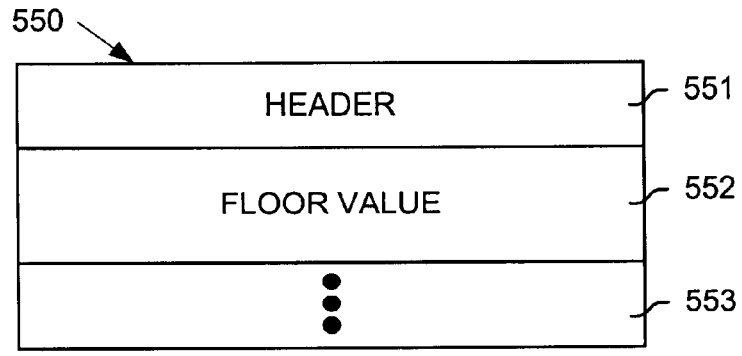
FIG. 5C illustrates an exemplary format of a packet containing a timestamp floor.
Figure 5D:
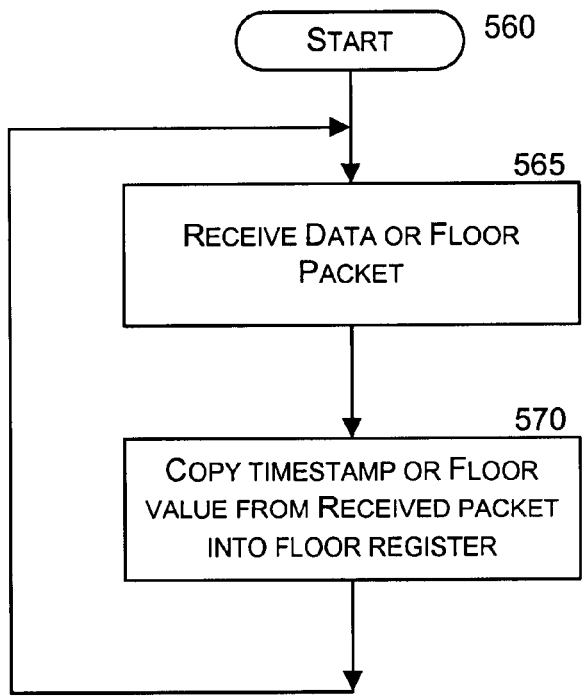
FIG. 5D is a flow diagram of another exemplary process for updating floor registers.

FIG. 5D illustrates a second embodiment for maintaining a timestamp value in a floor register. This second embodiment will update the floor register based on the contents of a packet 500 (FIG. 5A) or some floor register update packet, such as floor distribution or timestamp dummy packet 550 shown in FIG. 5C. Packet 550 contains a header field 551, a timestamp floor 552, and possibly other fields 553. One of many possible implementations for updating a floor register according to this second embodiment is illustrated by the flow diagram of FIG. 5D. Processing begins at process block 560 and proceeds to process block 565, where a data or floor packet is received. Next, in process block 570, the floor register is updated based on the received timestamp or timestamp floor. Processing then returns to process block 565 to receive more packets.

Figure 6:
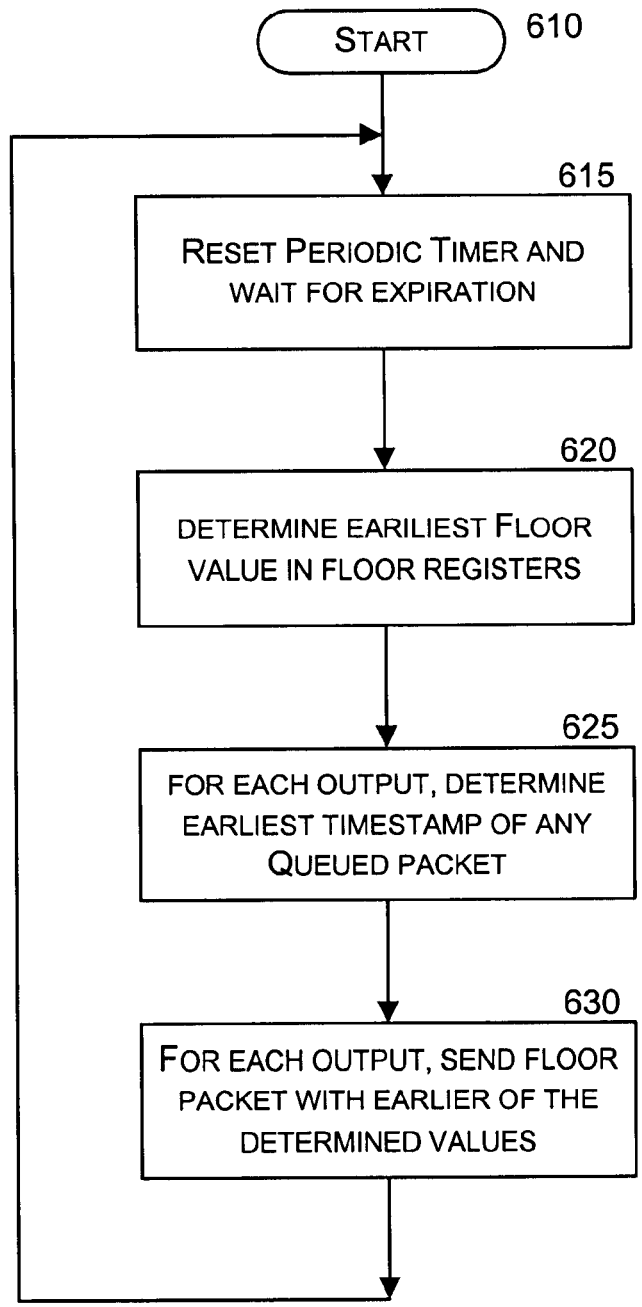
FIG. 6 is a flow diagram of an exemplary process for distributing timestamp floors.

Periodically, switch element 400 (FIG. 4A) distributes a timestamp floor to downstream packet switching components. In one embodiment, switch element sends a packet containing the timestamp floor. One such possible timestamp floor distribution packet format 550 is illustrated in FIG. 5C, which has been previously described herein. One of many possible embodiments for determining and periodically distributing a distribution timestamp floor 552 is illustrated by the flow diagram of FIG. 6.

Processing begins with process block 610, and proceeds to process block 615 where a periodic timer is reset and the embodiment waits for expiration of the timer. Next, in process block 620, the earliest timestamp floor in all the floor registers of the switching component is determined. Next, in process block 625, for each output (e.g., outgoing interface 425 of FIG. 4A), the earliest timestamp of any queued packet in its output queues (e.g., output queues 420 of FIG. 4A) is determined. Next, in process block 630, for each output, the earlier of the determined values is sent in a packet (e.g., packet 550 of FIG. 5C) to the next component or switch element of the packet switching system. Processing then returns to process block 615. Of course, many other techniques may be used in an embodiment to cause a periodic distribution of a timestamp floor.

FIG. 4B illustrates another embodiment of a switching element 460 that can be used in a packet switching system. Switching element 460 is similar to switching element 400 shown in FIG. 4A, with the addition of resequencers 480. Such a switching element would be used in the last stage of an interconnection network, since all packets going to any given output must pass through the same switch element in the last stage, allowing that switch element to implement the resequencing functionality. Some embodiments previously described herein included the resequencer functionality in another component, such as packet switching component 320 (FIG. 3A), packet switching component 340 (FIG. 3B), or switch interface 390 (FIG. 3C). In a configuration including switching element 460, switching element 460 may be used as a final stage switching element.

Switching element 460 comprising control logic and/or processor 471 (hereinafter "control logic"), memory 472, storage devices 470, incoming interfaces with floor registers 465, output queues with floor registers 480, outgoing interfaces 485, and one or more internal communications mechanisms 479 (shown as a bus for illustrative purposes). In certain embodiments, control logic 471 comprises custom control circuitry for controlling the operation of switching element 460 and no storage device 470 is used. Memory 472 is one type of computer-readable medium, and typically comprises random access memory (RAM), read only memory (ROM), integrated circuits, and/or other memory components. Memory 472 typically stores computer-executable instructions to be executed by control logic 471 and/or data which is manipulated by control logic 471 for implementing functionality in accordance with certain embodiments of the invention. Storage devices 470 are another type of computer-readable medium, and typically comprise disk drives, diskettes, networked services, tape drives, and other storage devices. Storage devices 470 typically store computer-executable instructions to be executed by control logic 471 and/or data which is manipulated by control logic 471 for implementing functionality in accordance with certain embodiments of the invention.

Switching element 460 receives distribution floor packets and uses the received timestamp floors in determining which packets are allowed to be sent out of switching element 460. Each switching element 460 receives packets 461 over one or more links with one or more other switching elements or components (not shown) via incoming interfaces 465. In other embodiments, communication interfaces have a folded topology. Additionally, switching element 460 sends packets 488 over one or more links with one or more output interface elements (not shown) such as via outgoing interfaces 485. Outgoing packets are placed in output queues 480. In one embodiment, there is an output queue 480 for each destination, or for each class of service for each destination.

In one embodiment, switch element 460 maintains a resequencer 480. This resequencer contains a packet queue and a floor register. The floor register is updated to maintain a time value that is a lower bound on timestamps of packets that will be received in the future. Packets in the resequencer's packet queue are ordered by their timestamp values. When the packet with the smallest timestamp value has a timestamp that is no larger than the value in the floor register, it is sent to the outgoing interface 485. Some embodiments of the resequencers 480 have been described in relation to FIGS. 3A–3D, and the operations of some embodiments for updating the floor registers and distributing a timestamp floor distribution packet are illustrated in FIGS. 5A–D, which have been described supra. In one embodiment of switching element 460, each floor register within resequencer 480 is updated each packet time with the smallest value of the timestamp floors stored in incoming interfaces with floor registers 465.

For simplicity of understanding, some embodiments have been described herein using one type of data structures and/or elements. As is apparent to one skilled in the art, numerous other embodiments are possible which use one or more of a wide variety of data structures and elements in keeping with the scope and spirit of the invention.

In the foregoing specification, the invention has been described with references to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A packet switching system comprising:
a first packet switching component; and
a second packet switching component;
wherein the first packet switching component includes:
a first floor register;
an output queue to store a plurality of packets; and
a set of logic to compare a timestamp from one of the plurality of packets with
a first timestamp floor maintained in the first floor register in
determining whether to allow a particular one of the plurality of packets
to be sent from the first packet switching component; and
wherein the second packet switching component includes:
a second floor register;
a second floor register updater to update a second value in the second floor register based on a timestamp of a received packet; and
a second floor register value distributor to propagate the second value to one or more switching components of the packet switching system.

2. The packet switching system of claim 1, wherein the particular one of the plurality of packets is allowed to be sent from the first packet switching component when a timestamp of the particular one of the plurality of packets is less than or equal to the value maintained in the first floor register.

3. The packet switching system of claim 1, wherein the second floor register is maintained in an incoming interface of the second packet switching component.

4. The packet switching system of claim 1, wherein the second floor register is maintained in a memory element of the second packet switching component.

5. The packet switching system of claim 1, wherein the first floor register is maintained with the output queue of the first packet switching component.

6. The packet switching system of claim 1, wherein the first floor register is maintained in a memory element of the first packet switching component.

7. The packet switching system of claim 1, wherein said one or more switching elements include the first packet switching component.

8. The packet switching system of claim 1, including a timestamp floor distributor to send the second value to the first packet switching component.

9. The packet switching system of claim 1, wherein said one or more switching elements include one or more intermediate switching elements connecting the second packet switching component to the first packet switching component.

10. The packet switching system of claim 9, wherein said one or more switching elements each include:
an intermediate floor register;
an intermediate floor register updater to update an intermediate value in the intermediate floor register based on a received intermediate timestamp floor; and
an intermediate floor register value distributor to propagate the intermediate timestamp floor to the second packet switching component.

11. A component of a packet switching system comprising:
a plurality of input interfaces, each of the plurality of input interfaces including a first floor register and a first floor register updater;
a plurality of first floor output queues; and
a first floor register value evaluator to determine a plurality of first timestamp floors to propagate to a plurality of next switching elements;
wherein each of the plurality of next switching elements includes: a plurality of next floor registers and a next floor register updater; a plurality of next floor output queues; and a next floor register value evaluator to determine a plurality of next timestamp floors to propagate to one or more resequencers; and
wherein each of the one or more resequencers includes: a plurality of resequencer output queues; at least one resequencer floor register; and control logic to compare a timestamp from one of a plurality of packets stored in the resequencer output queues with a final timestamp floor maintained in the least one resequencer floor register in determining whether to allow the one of the plurality of packets to be sent from a particular resequencer.

12. The component of claim 11, wherein the first floor register updater copies a timestamp from a received packet into the first floor register.

13. An apparatus, comprising;
means for receiving a plurality of packets having timestamp values;
means for maintaining a floor register based on the timestamp values of received packets;
means for distributing a distribution timestamp floor from a first subsystem;

means for receiving an output timestamp floor at a second subsystem;

means for maintaining an output queue in the second subsystem; and means for determining whether to send a stored packet from the output queue based on a stored timestamp value associated with the stored packet and the received output timestamp floor.

14. The apparatus of claim 13, further comprising:

means for maintaining an output queue of packets destined for the second subsystem within the first subsystem; and means for determining the distribution timestamp floor based on a value of a timestamp of a packet within the output queue of packets and a register value of the floor register.

15. The apparatus of claim 13, wherein the output timestamp floor includes the distribution timestamp floor.

16. The apparatus of claim 13, further comprising means for receiving the distribution timestamp floor at a third subsystem; means for deriving the output timestamp floor in the third subsystem; and means for sending the output timestamp floor to the second subsystem.

17. A method comprising:

receiving a plurality of packets having timestamp values;

maintaining a floor register based on the timestamp values of received packets;

distributing a distribution timestamp floor from a first subsystem;

receiving an output timestamp floor at a second subsystem;

maintaining an output queue in the second subsystem; and determining whether to send a stored packet from the output queue based on a stored timestamp value associated with the stored packet and the received output timestamp floor.

18. The method of claim 17, further comprising:

maintaining an output queue of packets destined for the second subsystem within the first subsystem; and determining the distribution timestamp floor based on a value of a timestamp of a packet within the output queue of packets and a register value of the floor register.

19. The method of claim 17, wherein the output timestamp floor includes the distribution timestamp floor.

20. The method of claim 17, further comprising receiving the distribution timestamp floor at a third subsystem; deriving the output timestamp floor in the third subsystem; and the sending the output timestamp floor to the second subsystem.

21. A method comprising:

receiving a plurality of packets on a plurality of input interfaces of a first component of a packet switching system;

maintaining a floor register for each of the plurality of input interfaces;

maintaining a plurality of output queues in the first component;

determining a plurality of distribution timestamp floors based on timestamp values associated with the plurality of received packets and a set of packets stored in the plurality of output queues; and sending the plurality of distribution timestamp floors from the first component of the packet switching system.

22. The method of claim 21, further comprising:

receiving the plurality of distribution timestamp floors at a second component of the packet switching system;

maintaining a plurality of buffering timestamp floors in the second component based on the received plurality of distribution timestamp floors;

maintaining a plurality of buffering output queues in the second component; and determining whether to send a packet from one of the plurality of buffering output queues based on a timestamp floor associated with a corresponding one of the plurality of buffering output queues.

23. The method of claim 22, wherein each of the plurality of distribution timestamp floors is the earlier of (1) an earliest value of the floor registers for the plurality of input interfaces and (2) a smallest packet timestamp value of the set of packets stored in one of the plurality of output queues.

24. An apparatus comprising:

means for receiving a plurality of packets on a plurality of input interfaces of a first component of a packet switching system;

means for maintaining a floor register for each of the plurality of input interfaces;

means for maintaining a plurality of output queues in the first component;

means for determining a plurality of distribution timestamp floors based on timestamp values associated with the plurality of received packets and a set of packets stored in the plurality of output queues; and means for sending the plurality of distribution timestamp floors from the first component of the packet switching system.

25. The apparatus of claim 24, comprising:

means for receiving the plurality of distribution timestamp floors at a second component of the packet switching system;

means for maintaining a plurality of buffering timestamp floors in the second component based on the received plurality of distribution timestamp floors;

means for maintaining a plurality of buffering output queues in the second component; and means for determining whether to send a packet from one of the plurality of buffering output queues based on a timestamp floor associated with a corresponding one of the plurality of buffering output queues.

26. The apparatus of claim 25, wherein each of the plurality of distribution timestamp floors is the earlier of (1) an earliest value of the floor registers for the plurality of input interfaces and (2) a smallest packet timestamp value of the set of packets stored in one of the plurality of output queues.

* * * * *

UNITED STATES PATENT AND TRADEMARK OFFICE
CERTIFICATE OF CORRECTION

PATENT NO. : 6,816,492 B1
DATED : November 9, 2004
INVENTOR(S) : Turner et al.

It is certified that error appears in the above-identified patent and that said Letters Patent is hereby corrected as shown below:

Column 1,
Line 60, replace "Beneg" with -- Beneš --.

Column 3,
Line 28, replace "Benes" with -- Beneš --.

Column 5,
Line 64, replace "DETAILED" with -- DETAILS --.

Column 10,
Line 6, replace "out-in" with -- out in --.

Signed and Sealed this

Twenty-seventh Day of September, 2005

JON W. DUDAS
*Director of the United States Patent and Trademark Office*